United States Patent Office 3,527,288
Patented Sept. 8, 1970

3,527,288
METHOD OF HEATING GASES
Joseph E. Guthrie, Florham Park, N.J., assignor to Esso Research and Engineering Company, a corporation of Delaware
No Drawing. Filed July 19, 1967, Ser. No. 654,369
Int. Cl. F28f 13/18
U.S. Cl. 165—1                                          12 Claims

ABSTRACT OF THE DISCLOSURE

The reversion of carbon monoxide to carbon and carbon dioxide while heating it to temperatures above about 850° F. is avoided by heating it in equipment containing over 25 wt. percent aluminum or chromium in the surfaces contacting the carbon monoxide.

---

This invention relates to heating carbon monoxide-containing gases to high temperatures. More particularly, it relates to heating carbon monoxide-containing gases for use as reducing agents, especially for the reduction of metallic ores by direct contact in a fluidized bed.

It is well known to produce metallic iron by reduction of oxidic iron ores, i.e., ores containing or consisting essentially of oxides of iron, in beds fluidized by ascending reducing gases at temperatures ranging generally from about 1000° F. to just below the sintering temperature, i.e., about 1800° F. for most ores. In such processes several fluidized beds are generally provided, and these are staged as separate reduction zones operated at the same or different elevated temperatures. Generally the several fluidized beds are housed within a single reactor.

In a typical staged fluidized iron ore reduction process, particulate oxidic iron ores are introduced into the top of a reactor and flowed downwardly from one fluidized bed to the next succeeding bed, and within each bed the state of oxidation of the ore is progressively lowered. Thus, the ore flows from one of a series of staged reduction zones to the next succeeding stage. Within each of the several stages the ore is contacted by upwardly flowing gases containing hydrogen or carbon monoxide, or both, and reduced, while concurrently the reducing components of the ascending gases are oxidized.

In order to operate a fluidized ore reduction process economically it is generally necessary to recycle unreacted reducing gas. This is accomplished by first cooling the gas and then regenerating it by removing at least a part of the oxidation products, i.e., water or carbon dioxide, or both. The regenerated gas is then reheated to high temperatures. Usually the heating of regenerated recycle gas is accomplished by passing the gas through tubes in a furnace, which tubes are composed of ferrous metals such as carbon steel or steel alloys of iron, nickel and chromium such as stainless steels.

The heating of carbon monoxide-containing gases in contact with catalytic metals, e.g., metals containing nickel or iron, or both, under certain conditions may cause difficulties due to the metals catalyzing the carbon monoxide reversion reaction:

$$2CO \rightarrow C + CO_2$$

The reversion of carbon monoxide leads to coking and plugging of the process equipment, e.g., heat exchanger or furnace tubes, and can result in catastrophic carburization and metal dusting. The latter phenomena sometime occur at high temperatures and are believed to be due to the reaction of carbon or carbon monoxide with components of the ferrous metal tubes. Moreover, the production of carbon dioxide by the reversion reaction lowers the reducing power of the gas and consequently lowers overall process efficiency in an ore reduction process.

The precise conditions conducive to carbon monoxide reversion depend on the thermodynamic equilibrium and the kinetics of the reversion reaction. Generally, however, in the gas concentrations and pressure ranges conventionally employed in reducing gas heating facilities, serious problems are only encountered at temperatures ranging from about 850° F. to about 1650° F., particularly about 850° F. to about 1550° F. At temperatures below about 850° F. reversion kinetics are so slow that carbon deposition is generally nil. At temperatures above about 1650° F. the equilibrium for the reversion reaction shifts so far to the left that reversion is encountered only at very high pressures or carbon monoxide concentrations.

There has thus been a long-felt need for a method and means of heating carbon monoxide-containing gases in equipment containing catalytic metals without causing carbon monoxide reversion. Such heating can now be accomplished in accordance with the present invention.

This invention contemplates heating a carbon monoxide-containing gas without significant reversion of carbon monoxide to carbon and carbon dioxide under conditions which are thermodynamically and kinetically favorable for such reversion. The gas is heated by contacting it with a surface containing at least about 25 wt. percent, preferably at least about 40 wt. percent, of a metal selected from the group consisting of aluminum and chromium and maintaining the metal at a temperature higher than the temperature of the gas such that heat is passed from the metal to the gas.

When the gas which is to be heated is initially at a temperature lower than about 850° F., particularly when it is lower than about 500° F., it is preferred to preheat the gas to a higher temperature ranging from about 500° F. to 850° F. by conventional means, i.e., in conventional, e.g., ferrous metal, apparatus whose heating surfaces contain substantially less than 25 wt. percent aluminum or chromium, if any, before heating the gas with surfaces rich in aluminum or chromium according to this invention. Thus, the invention takes advantage of the fact that at low temperatures, even though a given gaseous composition may thermodynamically tend strongly toward reversion of carbon monoxide when in contact with catalytic metals, the kinetics of the reversion reaction are so slow as to cause no significant amount of reversion. Conversely, when the carbon monoxide-containing gas reaches a very high temperature such that the kinetics would be highly conducive to reaction but the thermodynamic equilibrium does not favor reversion, contact with conventional ferrous metal heating facilities is again preferable for further heating. In the intermediate temperature range where both the kinetics and the thermodynamic equilibrium favor carbon monoxide reversion, it is essential to heat the gas with the surfaces rich in aluminum or chromium and avoid contact with conventional ferrous metal surfaces containing less than about 25 wt. percent aluminum or chromium. Thus, the gas is heated without reversion under conditions conducive to reversion by passing it through a non-catalytic heating zone defined by a boundary material rich in aluminum or chromium, or both.

The intermediate temperature range in which it is required to heat carbon monoxide-containing gas by contact with materials rich in aluminum or chromium will generally range from about 850° F. to 1650° F., and more generally from about 850° F. to 1550° F., for reducing gases to be used in a fluidized iron ore reduction process.

The process of this invention can be carried out, e.g., by passing the gas through a heating means having one or more tubes or conduits which are heated directly or indirectly to transfer heat to the gas. Thus, ferrous metal tubes in a furnace can be modified to use in accordance with this invention by coating or enriching the inner walls with alumium or chromium. The coating or enriched surface can be very thin, e.g., 0.020 inch or even less. It can be applied by conventional aluminizing or chromizing techniques by means of which the surfaces of the tubes can be treated with, e.g., aluminum or chromium oxides under high temperature reducing conditions, thereby enriching the surfaces to contain at least 25 wt. percent aluminum or chromium. Preferably, to produce tubes capable of longer service without becoming catalytic to reversion, the surfaces are treated to contain at least 40 wt. percent of aluminum or chromium. Any conventional means of applying the aluminum or chromium can be used, and this invention is intended to be limited to any specific technique. The maximum amount of aluminum which can be present depends on the maximum temperature at which the enriched or coated surface are to be used. The higher the concentration of aluminum, the lower the softening and melting points of the surface will be.

In a particularly preferred embodiment of the invention the method of heating carbon monoxide-containing gas without reversion is employed in combination with a fluidized iron ore reduction process. In such a combination process, reducing gas containing carbon monoxide is introduced at about 900° F. to 1800° F. into a reactor having a fluidized bed of iron ore. The carbon monoxide in the reducing gas is partially oxidized to carbon dioxide. The spent reducing gas is then recovered, cooled and part of its carbon dioxide is removed to regenerate its reducing power. The regenerated gas is then reheated, usually to temperatures above about 1550° F., and recycled back to the ore reduction reactor. In the preferred process combination the regenerated gas which is recycled contains about 40 to 80 mole percent, preferably about 40 to 60 mole percent hydrogen, about 10 to 30 mole percent, preferably about 15 to 25 mole percent carbon monoxide, and less than about 5 mole percent, preferably less than about 1 mole percent carbon dioxide, on a water-free basis. There may also be minor amounts of light hydrocarbons such as methane, ethane, etc., if the reducing gas was initially formed from hydrocarbons. The pressure in the heating zone should be at least about 50 p.s.i.g., preferably about 50 to 200 p.s.i.g., to prevent reversion from occurring at temperatures above about 1550° F., or even above about 1650° F. in contact with apparatus which has not been enriched in aluminum or chromium.

Since the temperatures employed in a fluidized iron ore reduction process cover all or substantially all of the range conducive to reversion, the heating method and means of this invention are especially useful in such a process. Conversely, the gases for which this heating method has optimum utility make excellent reducing agents for the direct iron reduction process.

The invention will be better understood by reference to the following examples and demonstrations.

EXAMPLE 1

A series of tubes 1 inch in inside diameter are installed in a direct-fired furnace and equipped with thermocouples spaced at intervals along the inside of the tube walls.

Reducing gas is introduced at a rate of 6 cubic ft./minute and 80 p.s.i.g. at ambient temperature and passes through stainless steel tubes having an aluminum-rich coating 0.020 inch thick on the inside, having a surface containing about 55 wt. percent aluminum. The gas is heated to about 1800° F. as it leaves the furnace. For comparison, an identical flow of the same gas is passed through an unenriched stainless steel tube. The temperatures along the tubes are recorded continuously. After equilibrium conditions have been reached, the operation is alowed to continue for 40 hours and then the reducing gas flow is stopped. The tubes are allowed to cool down and are then removed from the furnace and cut open lengthwise. Inspection of the tubes shows no evidence of carbon deposition in the aluminum-enriched tubes.

In sharp contrast, as shown in the following table, all of the uncoated stainless steel tubes are completely plugged with carbon deposits in 16 hours or less. The deposition begins at points in the tubes corresponding to temperatures of about 950° F. and is heaviest at points corresponding to temperatures of about 1400° F. to 1550° F. Except where methane is present all carbon deposition ceases at temperatures above about 1575° F. When methane is present some deposition continues at higher temperatures due to thermal cracking.

| Molar gas composition, $CO/H_2/CO_2/CH_4$ | Temperature at points of heaviest deposition of carbon on uncoated stainless steel tubes, (° F.) | Time of plugging (hours) |
| --- | --- | --- |
| 20/59.5/0.5/20 | 1,450 | 8 |
| 20/79.5/0.5/0 | 1,500 | 9 |
| 20/57/3.0/20 | 1,550 | 13 |
| 100/0/0/0 | 1,400 | 16 |

EXAMPLE 2

In this example methane is reformed with steam in a conventional reformer to make reducing gas. The reducing gas is then injected at about 1600° F. into the bottom of a three-stage fluidized iron ore reduction unit. The gas ascends through the various stages, reducing the ore substantially to metallic iron while simultaneously being partially oxidized to water and carbon dioxide. The spent reducing gases are withdrawn from the top of the ore reduction reactor and cooled to about 200° F. to condense out the water. The remaining gas is then scrubbed in a conventional alkaline scrubber to remove most of the carbon dioxide. The regenerated gas is then fed at about 100° F. and 165 p.s.i.g. to a heating furnace. The gas has the following composition:

| | Mole percent |
| --- | --- |
| $H_2$ | 72 |
| CO | 12 |
| $CO_2$ | 1.0 |
| $CH_4$ | 14 |
| $H_2O$ | 1.0 |

The gas is heated to 850° F. in conventional carbon steel tubes one inch in inside diameter and then heated to 1600° F. in aluminum-lined tubes whose inner surfaces are enriched to about 45 wt. percent aluminum and further heated to 1800° F. in conventional stainless steel tubes. The exiting gas from the furnace is mixed with fresh makeup gas and recycled to the reactor.

After 150 hours the ore reduction process is shut down, and the tubes in the recycle gas heating furnace are opened for inspection. Examination shows no evidence of carbon deposition or corrosion.

In sharp contrast, when the foregoing is repeated in precisely the same manner except that the furnace tubes are without aluminum-enriched linings, some of the tubes are completely plugged due to coking and carbon deposition in only 22 hours. Inspection of the tubes shows heavy carbon deposition, and there is also evidence of some pitting and corrosion in some tubes.

Similar excellent results are achieved with tubes whose inner surfaces are enriched to at least about 25 wt. percent chromium.

While the preceding examples and demonstrations indicate that the invention is especially useful in a fluidized ore reduction process combination, it will be apparent to one skilled in the art that the heating method and apparatus of this invention may also be useful in many other processes where carbon monoxide-containing gases are used at high temperatures. It is also contemplated that the heating can be carried out in many types of apparatus. For example, the gases can be passed through a heated fluid bed or a fixed bed of particulate material whose surfaces have been enriched with aluminum or chromium. The invention is useful in connection with any heating means which is catalytic to reversion of carbon monoxide, such as iron, nickel and alloys thereof. As used in the appended claims, the term "ferrous metals" is intended to include all such conventional materials as are used in carbon steels and stainless steels.

What is claimed is:

1. An improved method for heating a carbon monoxide-containing gas without significant reversion of carbon monoxide to carbon and carbon dioxide under conditions thermodynamically and kinetically favorable for such reversion, which comprises contacting said gas with a metal surface containing at least about 25 wt. percent of a metal selected from the group consisting of aluminum and chromium, and maintaining said metallic surface at a temperature higher than the temperature of the gas, whereby heat is passed from the surface to the gas.

2. The method of claim 1 wherein the gas is contacted with said metallic surface at an initial temperature too low to be kinetically conducive to significant version and heated through an intermediate temperature range which is kinetically and thermodynamically conducive to reversion to a final temperature too high to be thermodynamically favorable for such reversion.

3. The method of claim 2 wherein said intermediate range is between about 850° F. and 1650° F.

4. The method of claim 2 wherein said initial temperature is in the range from about 500° F. to 850° F.

5. The method of claim 3 wherein said intermediate temperature range is between about 850° F. and 1550° F.

6. The method of claim 1 wherein said metallic surface comprises the inner walls of heat exchanger tubes suitable for heating said gas.

7. A method of heating a carbon monoxide-containing gas comprising passing the gas through a non-catalytic heating zone, said heating zone being defined by a boundary material containing at least about 25 wt. percent of a metal selected from the group consisting of aluminum and chromium, and heating the gas in said zone under conditions thermodynamically and kinetically favorable for the conversion of carbon monoxide to carbon and carbon dioxide by transferring heat through said boundary material into the gas.

8. A method for heating a carbon monoxide-containing gas from a range of temperatures too low to be conducive to significant reversion to a higher range of temperatures conducive to substantial reversion which comprises heating the gas in a heat exchanger whose inner walls in contact with the gas over most of said low range of temperatures consist principally of ferrous metals containing less than about 25 wt. percent of members selected from the group consisting of aluminum and chromium, and whose inner walls in contact with the gas over said higher range of temperatures consist principally of ferrous metals containing at least about 25 wt. percent of a metal selected from the group consisting of aluminum and chromium.

9. The method of claim 8 wherein said low range of temperatures is below about 850° F. and said higher range of temperatures is above about 850° F.

10. In an apparatus for heating carbon monoxide-containing gases from a range of temperatures too low to be conducive to significant reversion to a higher range of temperatures conducive to substantial reversion comprising an unenriched ferrous metal conduit adapted for passage of gas therethrough, said conduit having an initial section with inner walls adapted to contact the gas at the low range of temperatures and a subsequent section with inner walls adapted to contact the gas at the higher range of temperatures, and means for heating the outer walls of said conduit, the combination comprising an unenriched ferrous metal inner conduit wall adapted to contact the gas in at least a major portion of said initial section and an enriched inner conduit wall having a surface containing at least about 25 wt. percent of a metal selected from the group consisting of aluminum and chromium in said subsequent section adapted to exclude the gas from contacting the unenriched ferrous metal in said subsequent section.

11. The apparatus of claim 10 wherein the unenriched ferrous metal inner conduit wall is adapted to contact the gas until said gas is heated to a temperature above about 500° F.

12. The apparatus of claim 10 wherein said surface contains at least about 25 wt. percent aluminum.

References Cited

UNITED STATES PATENTS 3,392,218    9/1968    Kalina _____ 263—52

ROBERT A. O'LEARY, Primary Examiner

C. SUKALO, Assistant Examiner

U.S. Cl. X.R.

165—133; 263—52